United States Patent [19]
Grosz et al.

[11] Patent Number: 5,437,058
[45] Date of Patent: Jul. 25, 1995

[54] WIRELESS SHIPBOARD DATA COUPLER

[75] Inventors: Francis Grosz, Chalmette; Ronald Miles, Slidell, both of La.; Clifford R. Holland, Picayune, Miss.; Sean Griffin, New Orleans, La.

[73] Assignee: The United States of America as represented by the Secretary of the Navy, Washington, D.C.

[21] Appl. No.: 68,816

[22] Filed: May 28, 1993

[51] Int. Cl.[6] .................... H04B 5/00; G01R 33/04; G08C 19/02
[52] U.S. Cl. ..................... 455/41; 324/263; 114/270; 340/870.31
[58] Field of Search ............. 114/270; 455/40, 41; 340/870.31, 4.32; 324/263

[56] References Cited

U.S. PATENT DOCUMENTS

| | | | |
|---|---|---|---|
| 2,499,195 | 2/1950 | McNiven | 455/40 |
| 3,964,051 | 6/1976 | Gilstrap, Jr. | 455/40 |
| 4,932,006 | 6/1990 | Delignieres | 340/870.32 |
| 5,241,410 | 8/1993 | Streck et al. | 455/40 |
| 5,293,400 | 3/1994 | Monod et al. | 455/41 |

OTHER PUBLICATIONS

Grosz et al., Investigation of the Use of Surface Electrical Currents for Short Range Shipboard Data Communications, Tech. Note 268, NOARL, Jun. 92.

Primary Examiner—Chi H. Pham
Assistant Examiner—Mark D. Wisler
Attorney, Agent, or Firm—Charles J. Stockstill; Thomas E. McDonnell

[57] ABSTRACT

The wireless shipboard data coupler allows transmission of data through steel ship bulkheads and submarine pressure hulls without the need for special wiring penetrations. Shipboard sensing data with a 1.0 MHz current is injected into the steel plating adjacent to a ships bulkhead, or onto the pressure hull at any penetration providing an electrical path or discontinuity to the opposing side of the bulkhead or pressure hull through the use of copper-plated, threaded electrodes. The injected current flows as a surface, or "skin effect" current between the electrodes and in an indirect, spread, pattern wrapping around the edge of the penetration. This produces a pattern of surface currents on the opposite side of the ships bulkhead or submarine pressure hull. As the injected current is modulated, the data is received on the other side of the bulkhead or pressure hull using coupling loops to sensing the electrical field generated by the surface currents.

43 Claims, 4 Drawing Sheets

WIRELESS SHIPBOARD DATA COUPLER

BACKGROUND OF THE INVENTION

1. Field of the Invention

The present invention relates to the transmission and reception of shipboard data and particularly to the transmission of a data bit stream through a steel ship bulkhead and submarine pressure hull without the need for special wiring penetrations.

2. Description of Related Art

In ships and submersibles, extensive testing following construction and modification is required during the operational life of the vessel that usually involves the temporary installation, and later removal, of hundreds of sensors in dozens of vessel compartments. This has, traditionally, required the installation of instrumentation wiring routed through special penetrations temporarily cut in the bulkheads separating ships compartments. Before and after testing, these penetrations must be fitted with capped off "stuffing tubes" to maintain the watertight integrity of the ship. The installation and removal of these "stuffing tubes" is both costly and time consuming.

In submersible vessels, such as submarines, there is often a need to transmit data from special sensors located outside of the pressure hull to collection equipment located inside the pressure hull. Because of the extreme pressures of submergence, any connection between the outside and the inside of the pressure hull requires special types of hull penetrations. The safe preparation and maintenance of these penetrations are both costly and time consuming because of the special requirements imposed on their installation and removal. Existing fittings in the hull may be utilized, however, such fittings are not necessarily readily available for use at the locations required.

Considerable effort has been expended in attempts to develop acoustic or ultrasonic wireless transmission techniques. These efforts have resulted in varying degrees of success, but at greater expense, complexity and susceptibility to noise. Acoustic techniques are particularly vulnerable to a wide variety of hull-borne noises which originate from the many mechanical sources aboard the ship which degrades the quality of the data being transferred. Ultrasonic techniques have proven considerably more complicated and sensitive to location and orientation during installation, thereby increasing the costs when utilizing such techniques.

SUMMARY OF THE INVENTION

One object of this invention is to provide a method and apparatus of transmitting data through a ships bulkhead or pressure hull subject to minimal interference from mechanical noise sources.

Another object of the invention is to transmit the data stream through the ships bulkhead or pressure hull without the need of leaving hatches or watertight doors open without requiring costly installation and removal of special penetrations.

A further object of this invention is to provide a method and apparatus for transmitting a data stream through a ships bulkhead or pressure hull in a manner that installation and removal is simple and quick with minimal refurbishment.

The wireless shipboard data coupler of the invention allows for the transmission of data bit streams through ships bulkheads and pressure hulls without a penetration of the structure. A transmitter converts the data stream to an electric current that is applied to a multiple of copper-plated steel electrodes attached the structure adjacent to a ships hatchway or watertight door, or onto a vessels pressure hull, at any penetration providing an electrical path or discontinuity to the opposing side of the bulkhead or pressure hull. This current flows around the hatchway or discontinuity edge to the opposite side of the bulkhead or pressure hull and is there sensed either by an induction coil or sensing electrodes, and is then applied to the input of a receiver. The receiver filters any responses that are out of the desired bandwidth, amplifies the resultant signal and converts the sensed current into a data bit stream which is applied to a display or recording device for evaluation.

DESCRIPTION OF THE PREFERRED EMBODIMENT

Figure 1A:
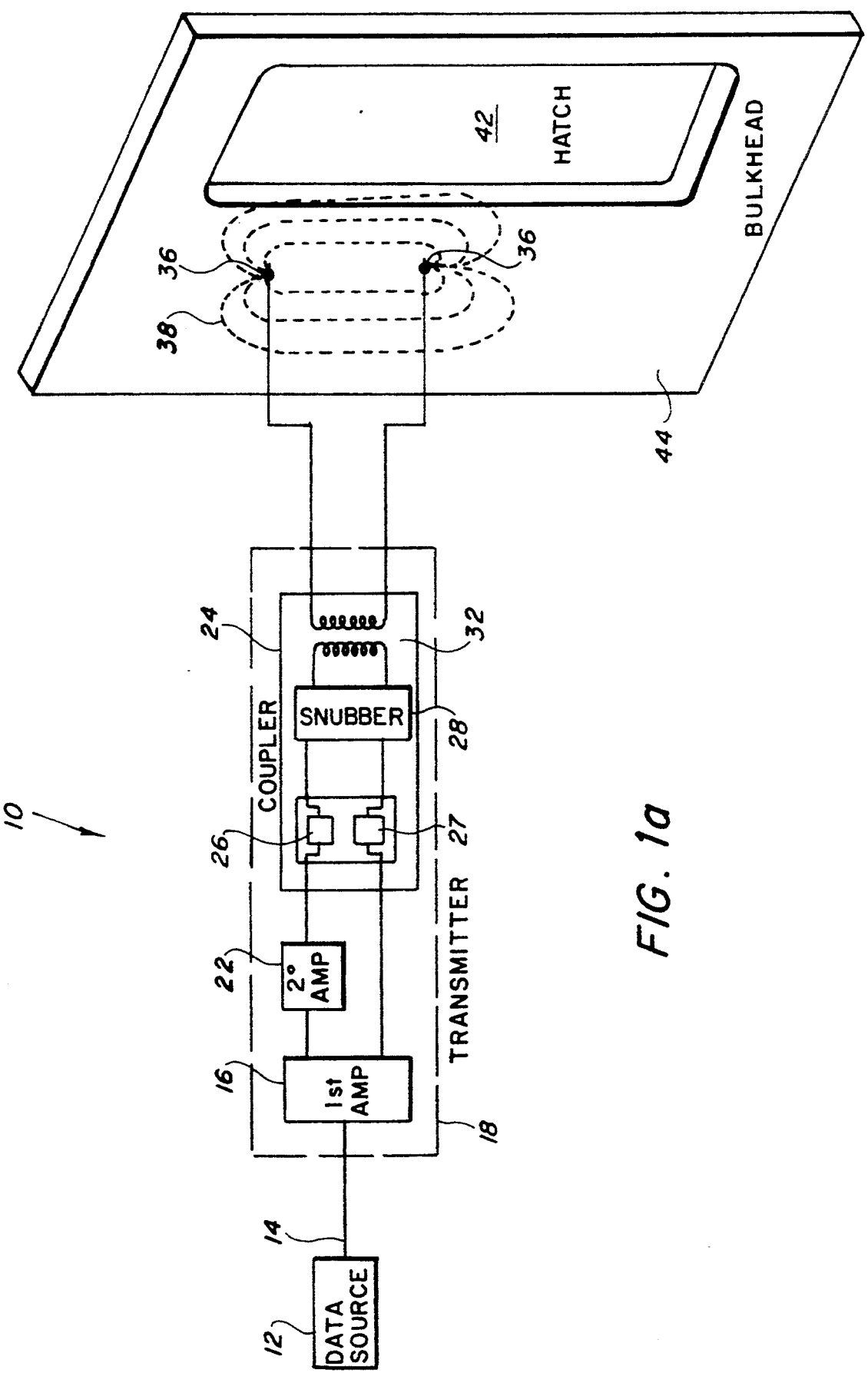
FIG. 1a, is a schematic block diagram of the wireless data coupler transmitter circuitry of the invention.

In the wireless shipboard data coupler 10, FIG. 1a, a data bit stream modulated at 1.0 to 3.0 MHz superimposed on an ac carrier is injected into the steel plating 44 adjacent to a penetration 42, i.e., a ships watertight door, hatch, or other gasketed bulkhead or a pressure hull penetration. The penetration 42 must be capable of causing an electrical discontinuity thereby providing an electrical path to the opposing side of the bulkhead or pressure hull.

A data source 12 capable of generating a data bit stream on the order of one Mbps is used to generate the data bit stream. Such a data source may be a sensor, computer or other transmitting device. The preferred data source utilizes a Manchester Type II encoded data stream technique which is well known to individuals practicing in the art. Manchester encoding generates a data bit stream of 1 Mbps at 1 MHz.

The encoded digital data stream is applied to the transmitter electronics 18 at a data rate of up to 1 Mbps through line 14. Utilizing the Manchester system, the dc signal level of the data bit stream entering the first amplifier 16 (Manufactures Part No. OP227, manufactured by Analog Devices of Norwood, Mass.) is adjusted up or down to provide the proper drive level for the VMOS field-effect transistors 26 and 27 (i.e., Manufactures Part No. 2N6766, manufactured by Motorola Corp. of Phoenix, Ariz.) that function as power transistors in a coupler 24. (If the lower data rate system is utilized, an ac carrier is imposed on the dc level of the data signal in the first amplifier 16 thereby modulating the signal prior to the drive level being adjusted.)

The output of the first amplifier is applied to both a second amplifier 22 and a first VMOS field-effect transistor 26 in the coupler 24. The second amplifier 22 has an input dc signal level equal to the output dc signal level in the first amplifier 16. In the second amplifier 22, the dc signal level is converted to an ac component phase angle 180 degrees out of phase with that of the first amplifier 22. The output of the second amplifier is applied to a second VMOS field-effect transistor 27 in the coupler 24.

The voltage level of the outputs of the first and second amplifier 16, 22, respectively, approximates the bias level of the transistors 26 and 27, respectively, so as to cause the transistors 26 and 27 to be in Class AB operation. Because the ac components of the first and second amplifiers 16 and 22, respectively, are 180 degrees out of phase, the transistors operate as power amplifiers in the push-pull mode. Transistors 26 and 27 receive a relatively low voltage from the first and second amplifiers 16 and 22, respectively, and raise that voltage to a sufficiently high level to drive a very "lossy" transformer 32 at a very low current (approximately 250 ma).

The voltage output from transistors 26 and 27 is applied to the transformer through a snubber circuit 28 to eliminate high voltage peaks reflecting back from the transformer 24 that may cause damage to the transistors 26 and 27. The design of the snubber circuitry is well known to individuals practicing the art and requires no further description.

The transformer 32 is capable of matching the output of the transistors 26 and 27 for application to essentially a short circuit at a plurality of driver electrodes 36. A low input voltage and high amperage with an extremely low impedance, a hundredth of an ohm or less, is present at the input to transformer 32. The input windings to the transformer 32 optimally consists of 110 turns of 72 AWG wire around a toroid core (Manufacturers Part No. T-200-2, manufactured by Amidon Associates of North Hollywood, Calif.), and is center-tapped. The output windings of the transformer 32 optimally consist of 10 turns of 14 AWG wire producing a low voltage (a fraction of a volt) and high current (typically 3 amperes) for application to the drive electrodes 36. The level of the current in the output windings of the transformer 36 that is applied to electrodes 36 may be as high a level as desired, however, consideration must be given to interference with other operating systems in the surrounding area and the heat generated by very high current levels.

The drive electrodes 36 are comprised of a plurality of copper-plated steel threaded drive electrodes (preferably two) attached to the steel plating 44 using a stud welding technique. Although the drive electrodes 36 are nominally 10–24 copper-plated steel, the only requirement is that the electrodes 36 be capable of accepting an applied current of 1–3 amperes. The stud welding technique for attachment of the electrodes 36 to the steel plating 44 is well known to individuals practicing the art and requires no special or unique procedures.

As the current from the transformer 32 is injected into the electrodes 36, an electrically induced field or "skin effect" current 38 is generated which tends to spread out from the drive electrodes 36 in an indirect, spread pattern around the edge of the penetration 42 producing a pattern of surface currents 38 on the opposite side of the steel plating 44 where it is sensed by a coupling loop 46.

Figure 1B:
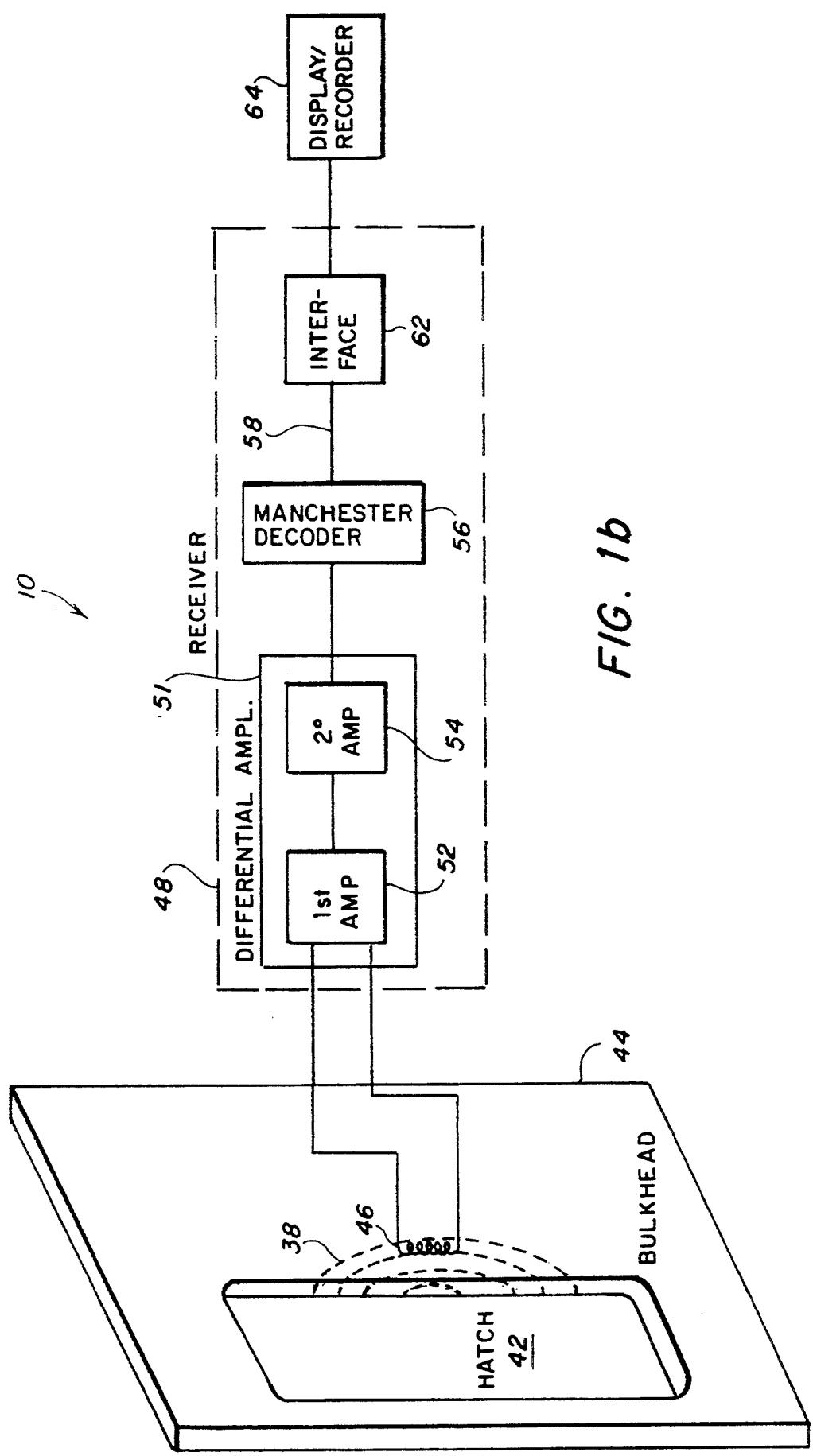
FIG. 1b, is a schematic block diagram of the wireless data coupler receiver circuitry of the invention utilizing an induction coil.

The magnetic field generated by the electric induced current 38, FIG. 1b, is sensed by an induction coil 46 and applied to a receiver 48. A very low voltage modulated electrical signal generated by the magnetic field is detected by a coupling loop 46 and applied to a low-noise balanced differential amplifier 51 in the receiver 48. The low-noise balanced differential amplifier 51 minimizes amplification of common-mode signals from many noise sources. A plurality of very low noise operational amplifiers, 52 and 54, (i.e., Manufacturers Part No. OP37A, manufactured by Motorola Corp. of Phoenix, Ariz.) comprise the differential amplifier 51.

A first amplifier 52 increases the digital signal to a higher voltage without introducing any, or minimal, additional noise, and applies the output to a second amplifier 54 through a high-pass filter network (not shown). Filtering is required to remove any signal components exceeding the desired bandwidth of 1 MHz.

In the second amplifier 54, the output of the first amplifier 52 is again amplified and, after passing through a low-pass filter network (not shown), is applied to a Manchester decoder 56. The design of the required filtration networks is well known to individuals in the art and do not require any special definition.

The Manchester decoder 56 senses the incoming modulated electrical signal, from the second amplifier 54, demodulates it and converts it into a digital data bit stream output 58 at an appropriate level for acceptance by a standard computer serial communications interface devices 62 for application to a display/recorder device 64.

In the Manchester decoder, if the modulation of the signal transits from a low level to a high level, the Manchester decoder outputs a digital "one" and if the modulated signal transits from a high level to a low level, the Manchester decoder outputs a digital "zero", thereby forming the output digital data bit stream.

The preferred display/recorder device 62 is a computer, however, an oscilloscope with a magnetic recording device may be utilized or any similar display/recording apparatus.

Figure 2A:
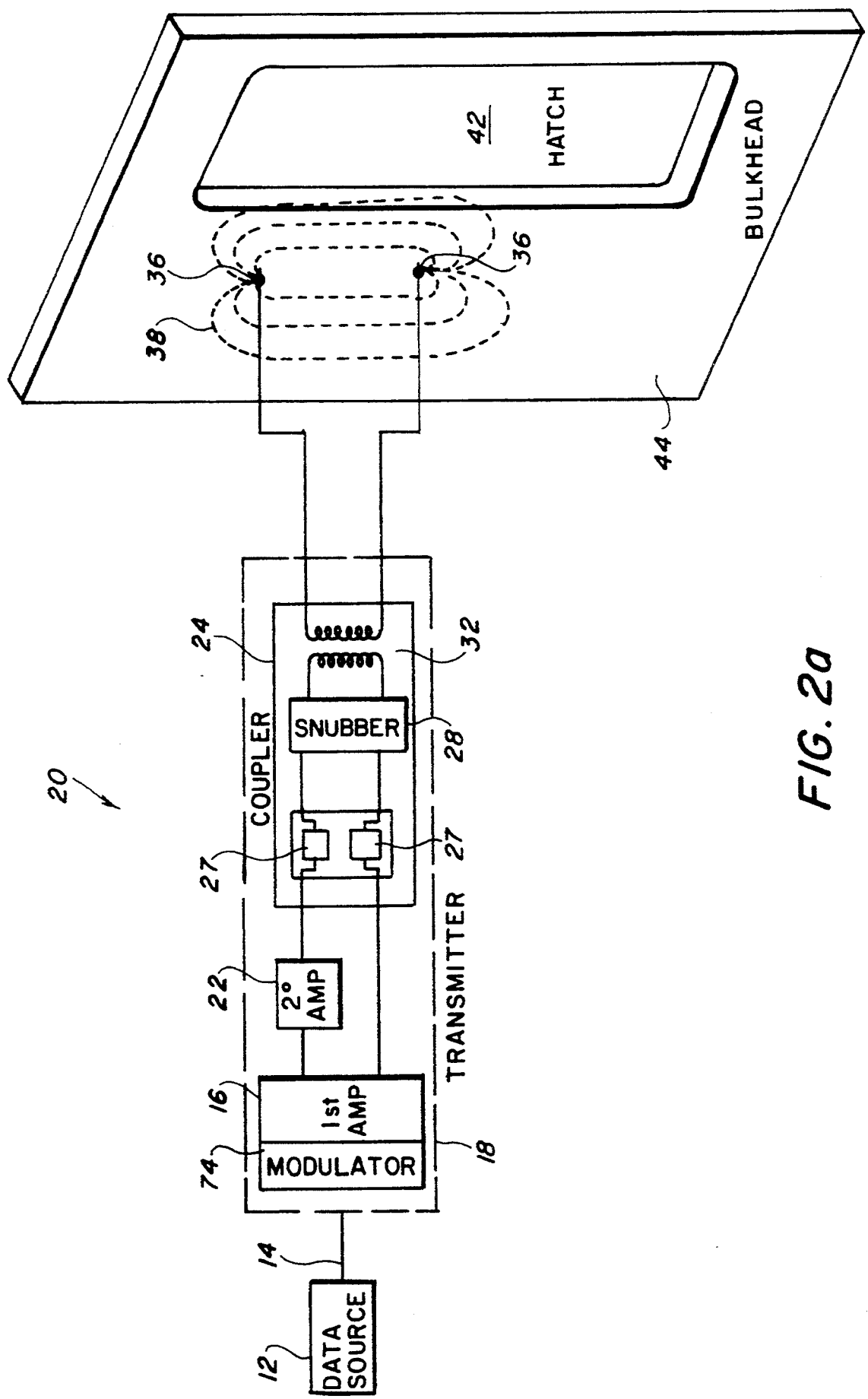
FIG. 2a, is a schematic block diagram of the wireless data coupler transmitter circuitry of the invention where sensing electrodes are utilized.

In a second preferred embodiment 20, FIGS. 2a, a device similar in operation to the above discussed embodiment is shown. However, instead of utilizing a Manchester Type II encoded data stream technique, a method for transmitting a lower data rate (approximately 10 Kbps) utilizing a subcarrier modulation scheme for transferring the data bit stream on a 1 MHz carrier is shown.

Utilizing the subcarrier modulation scheme, the data bit stream generated by the data source 12 is superimposed upon an ac carrier in a modulator 74 within the transmitter 18. The operation of the coupler 20 is similar to that described above to the injection of the output electrical current 38 from the transformer 32 into the bulkhead 44 at the drive electrodes 36.

Figure 2B:
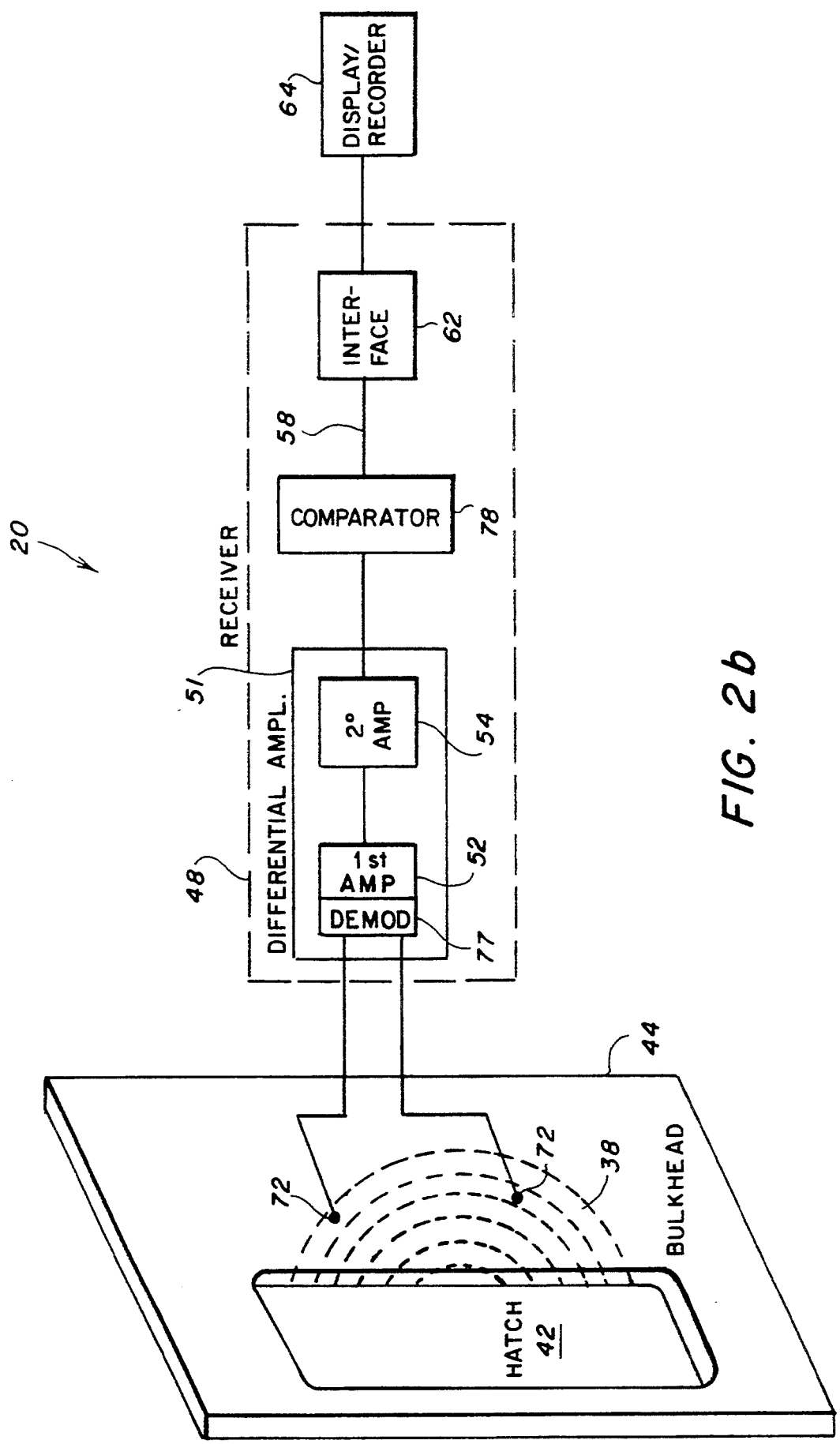
FIG. 2b, is a schematic block diagram of the wireless data coupler receiver circuitry of the invention where sensing electrodes are utilized.

Referring now to FIG. 2b, the surface current 38 generated on the surface of the bulkhead 44 spreads around the penetration 42 by a plurality of electrodes 72 (preferably two) on the opposite side of the bulkhead 44. These sensing electrodes 72 are similar to the drive electrodes 36, described above, are utilized for detection of the low-voltage current produced by the electrical field 38 and applied to a demodulator 77 in a differential amplifier 51 within a receiver 48.

In the receiver 48, the differential amplifier 51 amplifies and filters the data bit stream as discussed above and applies the amplified signal to a comparator 78.

The comparator 78 demodulates the incoming digital signal from the differential amplifier 51 and converts the data bit stream into an appropriate digital output for application through the interface 62 to a display/recorder 64, as described above.

The preferred embodiment, FIGS. 1a and 1b, utilizes a Manchester Type II encoded data bit stream technique and an induction coil 46 to detect the magnetic field of the surface current 38 and the second preferred embodiment, FIG. 2a and 2b, utilizes a data bit stream superimposed upon an ac carrier and sensing electrodes to detect the surface current 38. However, the method for generation of the modulated data bit stream and the sensing means may be interchanged in either embodiment, as long as the companion electronics for the demodulation of the modulated bit stream are also utilized.

Installation of the drive and sensing electrodes 36 and 72, respectively, as shown in FIGS. 1b and 2b, respectively, using the stud welding technique requires only a few minutes to install and remove. Removal can be accomplished by a single blow with a chisel at the base of the electrode 36. Minimal refurbishment of the bulkhead or pressure hull is required after removal to return the structure to its original condition.

In the embodiments described, the transmission of data through a ships bulkhead or pressure hull is immune to almost all noise sources capable of interfering with the data transmission. The invention is highly adaptable to typical shipboard compartment arrangements.

Although the preferred embodiments are applicable to the transfer of a data bit stream through a ships bulkhead or pressure hull, the potential uses for this invention will embrace any situation where it is necessary to transfer a data bit stream through a metallic surface without affecting a penetration of that surface. There are potential applications in nuclear or other hazardous or explosive environments, as well as in aircraft and automotive testing. Therefore it can be readily seen that the potential uses of the techniques and devices set forth above are only limited by the imagination of the individuals seeking to use them.

This specification sets forth the preferred embodiment for the transfer of a digital data stream through a ships bulkhead or pressure hull without making any special physical penetrations. However, it is realized that individuals skilled in the art may visualize many other methods for achieving the same result, but the scope of the invention is as set forth in the claims.

What is claimed is:

1. A wireless data coupler system comprised of:
   means for generating an encoded digital data bit stream;
   means for converting said data bit stream into a first modulated electrical current;
   a structure conducting said first modulated electrical current having a first and second side and a preexisting discontinuity;
   means for injecting said first modulated electrical current into said first side of said structure thereby causing an electrically induced field current to be generated which flows around the edge of said discontinuity to said second side of said structure;
   means for detecting a pattern of surface current generated by said electrically induced field current on said second side of said structure, and producing a second modulated electrical current;
   means for processing said second modulated electrical current to produce an output digital data bit stream; and
   means for displaying and recording said output digital data bit stream.

2. A data coupler system, as in claim 1, wherein said means for generating said encoded data bit stream and means for converting said data bit stream into a first modulated electrical current is a Manchester encoder.

3. A data coupler system, as in claim 1, wherein said means of converting said modulated data bit stream into a modulated electrical current is a transmitter accepting the modulated data bit stream, amplifying said data bit stream and converting said modulated data bit stream into a first modulated electrical current.

4. A data coupler system, as in claim 3, wherein said transmitter is further comprised of a center-tapped transformer for producing the first modulated electrical current for injection into the structure.

5. A data coupler system, as in claim 1, wherein said means for injecting the first modulated electrical current into the first side of the structure is a plurality of drive electrodes.

6. A data coupler system, as in claim 5, wherein the electrodes are made of copper-plated steel.

7. A data coupler system, as in claim 5, wherein the electrodes are stud welded to the structure.

8. A data coupler system, as in claim 1, wherein said means for detecting the second modulated electrical current on a second side of the structure opposite to the first side of the structure is an induction coil sensing the magnetic field and converting the magnetic field into an electrical current.

9. A data coupler system, as in claim 1, wherein said means for detecting the second modulated electrical current on a second side of the structure is a plurality of sensing probes.

10. A data coupler system, as in claim 9, wherein the electrodes are made of copper-plated steel.

11. A data coupler system, as in claim 10, wherein the electrodes are stud welded to the second side of said structure.

12. A data coupler system, as in claim 1, wherein the processing means is a receiver.

13. A data coupler system, as in claim 12, wherein said receiver is further comprised of a multiple of low-noise amplifiers to amplify said electrical current detected by said detecting means.

14. A data coupler system, as in claim 12, wherein said receiver is further comprised of a means for bandpass filtering the electrical current detected by said detecting means and removing any undesired out-of-band frequencies present thereon.

15. A data coupler system, as in claim 12, wherein said receiver is further comprised of a Manchester decoder for demodulating said electrical current and producing an output data bit stream.

16. A data coupler system, as in claim 12, wherein said receiver is further comprised of a computer serial interface for transmitting said data bit stream to said means for displaying and recording the output data bit stream.

17. A data coupler system, as in claim 12, wherein said receiver is further comprised of a comparator means for demodulating the detected magnetic field to produce an output data bit stream.

18. A data coupler system, as in claim 1, wherein said means for displaying and recording said output digital data bit stream is a computer.

19. A data coupler system, as in claim 1, wherein said means for displaying and recording said output digital data bit stream is an oscilloscope and a magnetic recording means.

20. A wireless data coupler system comprised of:
   a sensor generating an input data bit stream and modulating the input data bit stream;
   a transmitter for converting the modulated data bit stream into a first modulated electrical current;
   a structure conducting the first modulated electrical current having a first and second side and a preexisting discontinuity;
   a plurality of drive electrodes attached to the transmitter and the first side of the structure to inject the first modulated electrical current into the structure;
   an induction coil on the second side of the structure to detect a magnetic field generated by the first modulated electrical current flowing to the second side of the structure through the discontinuity and producing a second modulated electrical current;
   a receiver for processing the second modulated electrical current to produce an output data bit stream essentially the same as the input data bit stream;
   a display for displaying the output data bit stream; and
   a recorder for recording the output data bit stream.

21. A data coupler system, as in claim 20, wherein said data sensor is a Manchester encoder.

22. A data coupler system, as in claim 20, said transmitter being further comprised of a multiple of amplification stages and a center-tapped transformer for raising the amperage of said first modulated electrical current to an optimum of from 1 to 3 amperes for injection into said structure.

23. A data coupler system, as in claim 20, wherein said drive electrodes are made of copper-plated steel.

24. A data coupler system, as in claim 20, wherein said drive electrodes are stud welded to the first side of said structure.

25. A data coupler system, as in claim 20, the receiver being further comprised of a multiple of low-noise amplifiers to amplify the second modulated electrical current and a means for band-pass filtration for filtering the second modulated electrical current to remove any undesired out-of-band frequencies.

26. A data coupler system, as in claim 20, wherein the receiver is further comprised of a Manchester decoder for demodulating second modulated electrical current and producing an output data bit stream.

27. A data coupler system, as in claim 20, wherein the receiver is further comprised of a computer serial interface to interface said output data bit stream to said display and recorder.

28. A data coupler system, as in claim 20, wherein said receiver is further comprised of a means for demodulating the second modulated electrical current for converting said low-voltage electrical current into an unmodulated output data bit stream.

29. A data coupler system, as in claim 20, wherein display and recorder is a computer for displaying and recording the output data bit stream.

30. A data coupler system, as in claim 20, wherein the display is an oscilloscope and the recorder is a magnetic recorder for displaying and recording the output data bit stream.

31. A wireless data coupler system comprised of:
   a sensor generating an input data bit stream and modulating the input data bit stream;
   a transmitter for converting the modulated input data bit stream into a first modulated electrical current;
   a structure conducting the first modulated current having a first side and a second side and a preexisting discontinuity;
   a plurality of drive electrodes attached to the transmitter and the first side of the structure to inject the first modulated electrical current into the structure;
   a multiple of sensing electrodes attached to the second side of the structure to detect a second modulated electrical current flowing around the structure through the discontinuity to the second side of the structure;
   a receiver for processing the second modulated electrical current to produce an output data bit stream essentially the same as the input data bit stream;
   a display for displaying the output data bit stream; and
   a recorder for recording the output data bit stream.

32. A data coupler system, as in claim 31, wherein the data sensor is further comprised of a Manchester encoder for generating a data bit stream with a modulating carrier superimposed thereon.

33. A data coupler system, as in claim 31, wherein the transmitter is further comprised of a plurality of amplification stages and a center-tapped transformer for generating a first modulated electrical current having an amperage of an optimum of from 1 to 3 amperes for injection into the structure.

34. A data coupler system, as in claim 31, wherein the drive and sensing electrodes are made of copper-plated steel.

35. A data coupler system, as in claim 31, wherein the drive electrode is stud welded to the first side of the structure and the sensing electrode is stud welded to the second side of the structure.

36. A data coupler system, as in claim 31, wherein the receiver is further comprised of a plurality of low-noise amplifiers to amplify the second modulated electrical current and a means of band-pass filtering the second modulated electrical current to remove any undesired out-of-band frequencies.

37. A data coupler system, as in claim 31, wherein the receiver is further comprised of a Manchester decoder for demodulating the second modulated electrical current and producing an output data bit stream.

38. A data coupler system, as in claim 31, wherein the receiver is further comprised of a means for demodulating the modulated electrical current thereby producing an unmodulated output data bit stream.

39. A data coupler system, as in claim 31, wherein the receiver is further comprised of a computer serial interface to interface the output data bit stream to the display and recorder.

40. A data coupler system, as in claim 31, wherein the display is a computer for displaying and recording the output data bit stream.

41. A data coupler system, as in claim 31, wherein the display is an oscilloscope and the recorder is a magnetic recording device for respectively displaying and recording the output data bit stream.

42. A method for transmitting a data bit stream through a structure conducting electrical current having a preexisting discontinuity comprising, the steps of:
   generating a data bit stream;
   converting the data bit stream into a first modulated electrical current;
   transmitting the first modulated electrical current into the structure on a first side of the structure so as to generate a magnetic field within the structure;

receiving the magnetic field within the structure on a second side of the structure;

converting the magnetic field into a second modulated electrical current;

filtering the second modulated electrical current to remove out-of-band signal components;

converting the filtered second modulated electrical current into an unmodulated output data bit stream;

transmitting the output data bit stream to a display and recording device; and displaying and recording the output data bit stream.

43. A method for transmitting a data bit stream through a structure conducting electrical current having a preexisting discontinuity, comprising the steps of:

generating the data bit stream;

converting the data bit stream into a first modulated electrical current;

transmitting the first modulated electrical current into a first side of the structure so as to generate a second modulated electrical current within the structure;

detecting an electrical potential generated by the second modulated electrical current on a second side of the structure;

amplifying, demodulating, and filtering the second modulated electrical current to remove out-of-band signals that may be present thereon thereby producing a demodulated second electrical current;

converting the demodulated second electrical current to an output data bit stream; and displaying and recording the output data bit stream.

* * * * *